(12) United States Patent
Mathias-Laot et al.

(10) Patent No.: US 11,933,926 B2
(45) Date of Patent: Mar. 19, 2024

(54) DEVICE FOR THE PREPARATION OF RADIOACTIVE SOLUTIONS

(71) Applicant: UNIVERSITÉ DE LORRAINE, Nancy (FR)

(72) Inventors: Guénolé Mathias-Laot, Nancy (FR); Quentin Thomas, Laneuveville-devant-Nancy (FR)

(73) Assignee: UNIVERSITE DE LORRAINE, Nancy (FR)

(*) Notice: Subject to any disclaimer, the term of this patent is extended or adjusted under 35 U.S.C. 154(b) by 33 days.

(21) Appl. No.: 17/617,610

(22) PCT Filed: Jun. 18, 2020

(86) PCT No.: PCT/EP2020/067020
§ 371 (c)(1),
(2) Date: Dec. 9, 2021

(87) PCT Pub. No.: WO2020/254527
PCT Pub. Date: Dec. 24, 2020

(65) Prior Publication Data
US 2022/0236432 A1    Jul. 28, 2022

(30) Foreign Application Priority Data

Jun. 18, 2019 (EP) .................................... 19305775

(51) Int. Cl.
*G01T 7/02* (2006.01)
*G01T 1/24* (2006.01)
(Continued)

(52) U.S. Cl.
CPC .............. *G01T 7/02* (2013.01); *G01T 1/244* (2013.01); *G21F 5/015* (2013.01); *G21F 5/12* (2013.01)

(58) Field of Classification Search
CPC . G01T 7/02; G01T 1/244; G21F 5/015; G21F 5/12; G21F 7/00
See application file for complete search history.

(56) References Cited

U.S. PATENT DOCUMENTS

| | | | |
|---|---|---|---|
| 4,270,052 A | 5/1981 | King | |
| 5,274,239 A | 12/1993 | Lane et al. | |
| 2009/0236536 A1* | 9/2009 | Lamb | A61N 5/00 250/252.1 |

FOREIGN PATENT DOCUMENTS

| | | |
|---|---|---|
| EP | 2575948 A2 | 4/2013 |
| FR | 3059567 B1 | 6/2018 |

(Continued)

OTHER PUBLICATIONS

International Search Report (with English translation) and Written Opinion dated Jul. 28, 2020 in corresponding International Application No. PCT/EP2020/067020; 9 pages.

*Primary Examiner* — Kiho Kim
(74) *Attorney, Agent, or Firm* — Maier & Maier, PLLC (57) ABSTRACT

A device for radioactivity counting and characterization for a solution. The device includes a container having at least two recesses, a first recess for receiving a vial and a second recess for receiving a radioactivity sensor, a radioactivity sensor having a semiconductor sensor presenting a cone of detection directed to the first recess of the container for receiving a vial, a removable closure element, an armored cover around the container and its upper face, the upper face of the armored cover having an opening for introducing the vial into the container and a plate for supporting the device.

17 Claims, 4 Drawing Sheets

(51) Int. Cl.
*G21F 5/015* (2006.01)
*G21F 5/12* (2006.01)

(56) References Cited

FOREIGN PATENT DOCUMENTS

WO        2011153519 A2   12/2011
WO   WO-2015153946 A1 * 10/2015  ............. A61B 5/055

* cited by examiner

DEVICE FOR THE PREPARATION OF RADIOACTIVE SOLUTIONS

FIELD OF INVENTION

The present disclosure relates to the field of preparation of radioactive solutions, and in particular of radiopharmaceutical drugs. The invention relates more particularly to a device for preparing such radioactive solutions and radiopharmaceutical drugs.

BACKGROUND OF INVENTION

As is known, so-called "radiopharmaceutical" (RPM) drugs contain artificial radioelements called radionuclides, which are used for diagnostic or therapeutic purposes and used in nuclear medicine departments. These medicinal products are either in the form of proprietary medicinal products containing radionuclides which are delivered ready for use, or in the form of radiopharmaceutical preparations which are prepared in situ and extemporaneously by labeling of carrier molecules, referred to as "kits" by the skilled person, with a chosen radionuclide from a generator. The most commonly used radionuclide in nuclear medicine is technetium 99m (<99m> Tc), which is readily available from the <99m> Mo/<99m> Tc generator and is administered as a pertechnetate solution. sodium. This solution is obtained by elution to give technetium 99m eluates in the form of sterile and pyrogen-free solutions.

Specifically, the vector molecules forming these kits are sterile and pyrogen-free substances, which are pre-packaged most often in the form of vials closed vacuum sealed. In known manner, it is generally used for the preparation of these drugs shielded enclosures (against isotope radiation) provided with round-type openings of gloves on the edges of which are fixed latex gloves where the operators introduce the hands. Some centers use enclosures that do not have integral gloves, replaced by traditional disposable latex or nitrile gloves worn by the user and changed with each manipulation. This practice is justified by the fact that the gloves attached to the enclosure are too thick and detrimental to the agility of the preparers, more comfortable with traditional thin gloves. This plays on the factor "time" to protect against radiation. The preparations are made by transfer of a diluted eluate to the kit vial using disposable syringes.

Once the RPM solution has been prepared, and passed through the activimeter, a sealed syringe protector is installed on the syringe.

The major drawbacks of these traditional preparation methods lie in the existence of very high radioactive dose rates in contact with the ends of the operator's fingers during the handling of the syringes, during the marking/reconstitution and fractionation steps, whereas vials can be handled with forceps.

The lack of mobility of devices surrounded by heavy armored caps in specialized parts may also be a drawback.

It is to these drawbacks that the invention intends in particular to remedy by proposing a device in which the human being involved is less exposed to radioactive emissions while improving the reliability of the measurement protocol. The device will also address the mobility issue as it will be portable.

SUMMARY

The subject-matter of the invention is a device for radioactivity counting and characterization for a solution, said device comprising:

- A container comprising at least two recesses, a first recess for receiving a vial and a second recess for receiving a radioactivity sensor,
- A radioactivity sensor comprising a semiconductor sensor presenting a cone of detection directed to the first recess of the container for receiving a vial,
- A removable closure means,
- An armored cover around the container and its upper face, said upper face of said armored cover comprising an opening for introducing said vial into the container,
- A plate for supporting said device.

In one embodiment, said periphery and upper face of the armored cover has a radial outer shell and an upper cover as two distinct components. This feature allows improving the assembly of the device according to the invention. Furthermore, a removable superior face facilitates changing said part.

In another one embodiment, the removable closure means is an end cap with an opening for introducing a syringe needle.

In another one embodiment, the end cap with an opening for introducing a syringe needle is connected to a pump by means of a tube and a connector of complementary form.

In another one embodiment, the removable closure means is a full end cap for covering a vial. This embodiment allows the user to inject directly to a patient the solution taken during a treatment, for example by means of a pump.

In another one embodiment, it includes energy supply means, preferably batteries. A power supply is required for the operation of the device, the use of battery facilitates transport and use without having access to a fixed wired power supply.

In another one embodiment, it includes a keypad. The keypad allows the user to type on it the various numerical quantities of solution expected for a sample or solution injection into the vial. A numerical calculation by deduction allows the device to inform the user that it has reached the target quantity.

In another embodiment, it includes a removable vial holder, said vial holder comprising a tab, said tab comprising a through-hole for receiving a user-finger to allow bringing out said vial holder.

In another embodiment, it includes an electronic board connected to a digital display screen to display the solution radioactivity, said digital display screen being located on the external surface of said armored cover.

The digital display screen displays the result of the radioactivity measurement of the radioactivity sensor and allows the user to know the quantity taken or injected into the vial in real time.

In another one embodiment, the detection cone has an axis perpendicular to the axis of insertion of the first recess of the container for receiving a vial so that the detection is carried out on the full vial volume.

The detection cone allows a measurement of the total volume of the solution.

In another embodiment, the radioactivity sensor has a detection range between 0.5 MBq and 150 GBq, preferably between 1 MBq and 120 GBq and even more preferably between 5 MBq and 100 GBq. The detection range allows a wide range of solutions to be measured depending on the isotopes that make it up.

In another embodiment, the container has a tilt angle between 10 and 45 degrees in relation to the axis perpendicular to the plane of the supporting plate, preferably between 10 and 15 degrees. The tilt allows the user to take the entire solution from the bottle even when the solution level is low.

In a preferred embodiment, there is a cavity in between the container and the outer shell, such cavity being filled with lead shot so as to protect the user against radiations In another embodiment, the device according to the invention includes an isotope measurement means for communicating with the radioactivity sensor to allow said radioactivity sensor to self-calibrate according to the isotope present in the vial.

The subject-matter of the invention is also a method for radioactivity counting and characterization for a solution comprising the following steps:
- insert a vial comprising a solution within the device according to the previous modes of realization,
- place an end cap with an opening so as to close the device,
- measure the radioactivity using the radioactivity sensor,
- enter required quantity of radioactive solution to be collected,
- collect the targeted solution with required quantity of radioactive solution using the syringe needle while the digital display screen measures real-time radioactivity.

Therefore, the method allows the user to avoid exposure to and/or contact with radiation by using the device. It also allows the user to use the device in all circumstances since the device is easily handheld.

In another one embodiment, a method for radioactivity counting and characterization for a solution comprise the following steps:
- insert an empty vial,
- enter required quantity of radioactive solution to be injected,
- inject with a syringe needle the required quantity of radioactive solution while the digital display screen measures real-time radioactivity,
- place a full end cap so as to close the device.

Therefore, the process allows the user to avoid exposure to and/or contact with radiation by using the device. It also allows the user to use the device in all circumstances since the device is easily handheld.

BRIEF DESCRIPTION OF THE DRAWINGS

The features and advantages of the invention will appear in the following description. It will be explained several modes of realization of the device and the method according to the invention. These are given as an example only and made by reference to the attached drawings in which.

DETAILED DESCRIPTION

The present invention concerns a device for radioactivity counting and characterization for a solution, in particular, radioactive solutions allowing the collection of products from the vial but also the preparation of a solution guaranteeing the safety of the user while being portable.

Regarding radioactivity, three radioactive emissions are known: they are named alpha, beta, and gamma, in increasing order of their ability to penetrate matter. Alpha particles may be completely stopped by a sheet of paper, beta particles by aluminium shielding. Gamma rays can only be reduced by much more substantial mass, such as a very thick layer of lead (6 mm at least) or concrete blocks (1 mm width at least). The current device more specifically focuses on counting and characterizing the gamma radiation. Gamma radiation (γ) is composed of photons as visible light, but are much more energetically loaded. It is a penetrating electromagnetic radiation arising from the radioactive decay of atomic nuclei. It consists of the shortest wavelength electromagnetic waves and so imparts the highest photon energy (over to 1 MeV). In a natural state, gamma radiation is quite rare.

It is well known that essential elements ensuring a good functioning of a radioactive sensor are followings:
- a radioactive sensor situated around radiation interacting with matter,
- an amplification system shaping and amplifying the released signal around the radioactive sensor,
- a signal treatment system (informatic and electronic).

Figure 1:
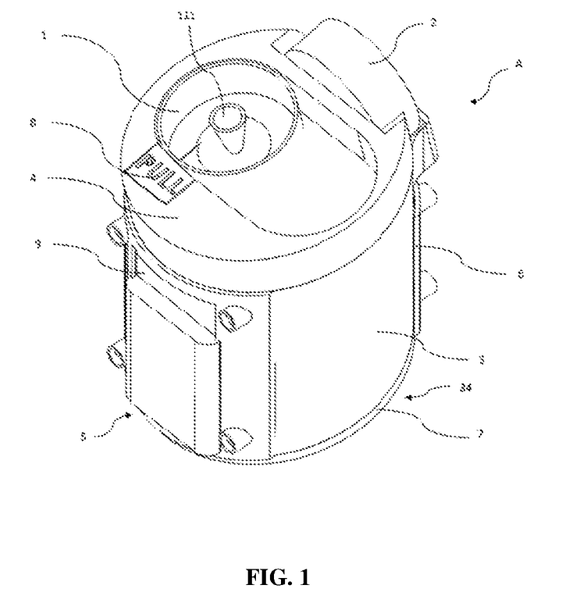
FIG. 1 is a perspective view of a device for radioactivity counting and characterization for a solution.
Figure 2:
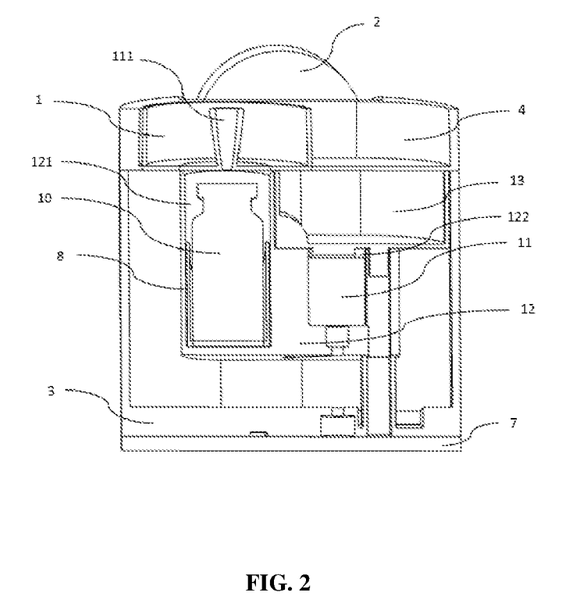
FIG. 2 is the first cross-section of the device in FIG. 1.

The device is especially designed to be easily transported. Referring to FIGS. 1 and 2, the device includes:
- A digital display screen 9 connected to an electronic board 14,
- A removable vial holder 8 with a tab 81 with the word "pull" on its upper side,
- An end cap 1 on the device,
- An opening 111 on the end cap 1,
- A full end cap 2 stored against the device in a storage space,
- An armored cover 34 comprising a radial outer shell 3 and an upper cover 4,
- A lower cover 5 for protecting the electronic board 14,
- A battery cover 6,
- A plate 7,
- A vial 10,
- A radioactive sensor 11, more specifically, a radioactive sensor 11 comprising a semiconductor radioactive sensor (or detector),
- A container 12 suitable to receive vial 10 and radioactive sensor 11, and
- A means for holding the sensor means for holding the sensor 13, A semiconductor is a material which has the electrical characteristics of an insulator, but for which the probability that an electron can contribute to an electric current is sufficiently high to eventually generate such a current, even if it is low. Its electrical conductivity is therefore intermediate, between metals and insulators. The electrical behavior of semiconductors is generally modeled using the "energy band theory". According to such theory, a semiconductor material displays a forbidden band small enough that electrons from the valence band can easily join the conduction band. If an electrical potential is applied, a weak electric current appears, induced both by the displacement of the electrons and the displacement of the "holes" that they leave in the valence band. Electrons and holes are called charge carriers. Electrons are negative charge carriers and holes are positive charge carriers. The electrical conductivity of semiconductors can be controlled by doping, by introducing a small amount of impurities into the material in order to produce an excess or a deficit in electrons. Differently doped semiconductors can be put together so as to be brought into contact in order to create junctions, making it possible to control the direction and the quantity of current which crosses the arrangement. In the current invention, the radioactive sensor 11 comprises a semiconductor silicon detector which displays excellent qualities (optical sensitivity, quantum efficiency, linearity of the sensor).

Thus, a particle with sufficient energy meeting the silicon detector, will withdraw an electron from an atom of the silicon crystal by transferring part or all of its energy to said electron. This energy transfer takes place in the form of a potential energy transfer (ionization) and a kinetic energy transfer. For example, a photon will create free electrons in the medium by photoelectric effect, Compton effect or creation of pairs. The semiconductor, here the silicon crystal, has thus the particularity to behave as a conductor when there is interaction of radiation and as an insulator when there is no interaction. The minimum energy necessary to lead an electron from the valence band (participating in the bonds between atoms) to be released in the conduction band (participating in a current generation), is called "gap". This renders the semiconductor, and silicon in particular, particularly well-suited for the measurement of gamma radiation because it makes it possible to discriminate the current caused by the particles from the thermal noise current.

The electron ejected during the interaction with the gamma radiations can, in turn, trigger a cascade of ionizations if the voltage regime at which the detector operates allows the acquisition of a high enough kinetic energy.

After thermalization, a cloud of free carriers is obtained within the semiconductor. The semiconductor is thus polarized by a high voltage, and the free charge carriers will be attracted to an electrode and thus generate a measurable current in a circuit connected to the detector.

As presented in FIG. 1, the device A includes an armored cover 34 to protect the user from all radioactive radiation, the armored cover 34 includes:
- a radial outer shell 3 surrounding the device A on its entire periphery, and
- an upper cover 4 covering the upper part of the device A, the upper cover 4 comprising a hollow of oblong shape, the maximum width of which is substantially equal to the diameter of the closing systems (end cap 1 or full end cap 2). This makes it possible to slide the closing systems to close or not the inlet intended to receive the vial 10.

The opening can also be rectangular for example or any other shape suitable for sliding. In this realization mode, the armored cover 34 is separated into two distinct elements, however the armored cover 34 can also be made integral with the upper cover 4. The upper side of device according to the invention comprising, in all cases, an opening for inserting the vial 10 into the container 12. The armored cover 34 can be made of lead, for example, or other materials that significantly attenuate or block radiation from the radioactive solution.

The armored cover 34 includes a compartment to insert batteries 15 to power the device A. In an alternative mode, the device A can also be powered by wired power or by rechargeable batteries, for example. This compartment is closed by a battery cover 6 in the same material as the armored cover 34 preferably. A different material, such as plastic or aluminum, can be used for the battery cover 6. The outer shell 3 constitutes the device structure and can be either in plastic or in aluminum. As a matter of fact, the cavity between the container 12 and the outer shell 3 is filled with lead shot so as to protect the user against radiations.

The use of a lighter material can be advantageous for the transport of the device A, because it allows to limit the weight of the device A according to the invention.

The device A is placed on a plate 7 also allowing total radiation protection for the user.

The device A has a cylindrical body but can also be cubic or convex polyhedron for example.

Figure 4:
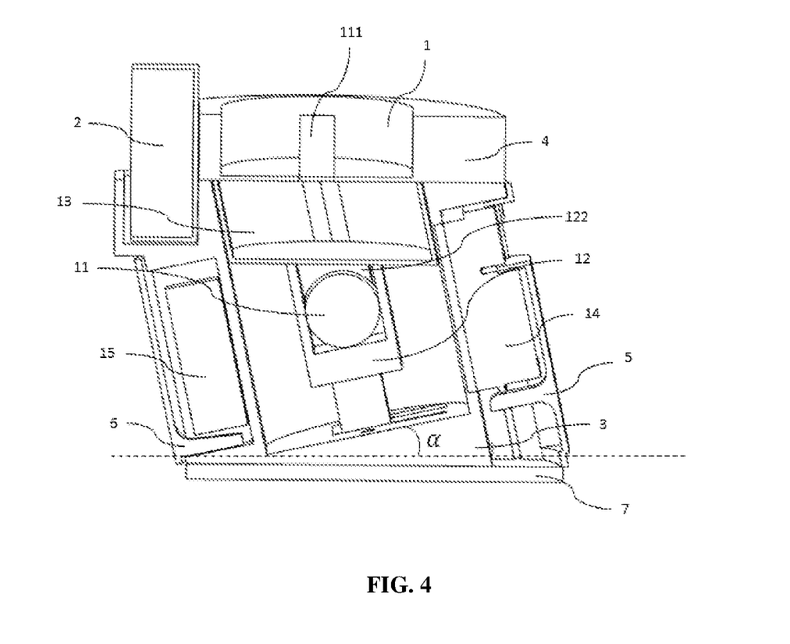
FIG. 4 is a second cross-section of the device of FIG. 1.
Figure 6:
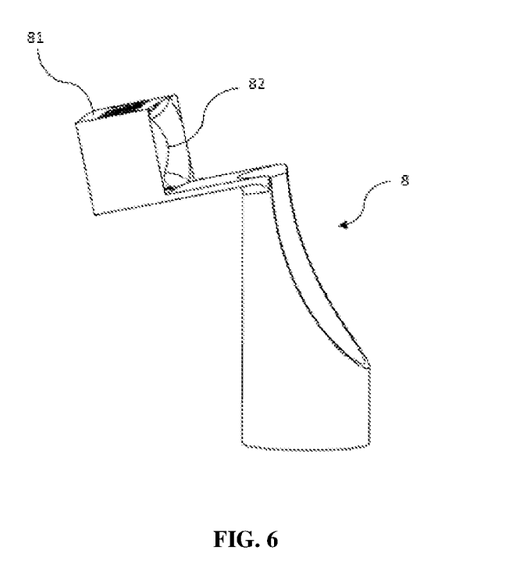
FIG. 6 is an isolated first view of vial holder of the device according to the invention.
Figure 7:
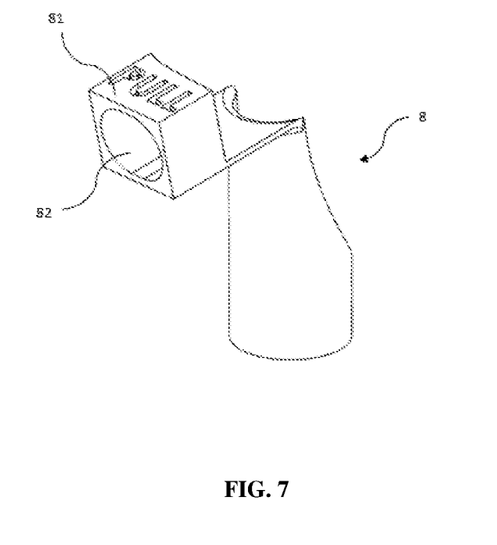
FIG. 7 is a second isolated view of the vial holder of the device according to the invention.

As can be seen in FIGS. 1, 2 and 4, the device A has an opening on its upper face allowing the vial 10 introduction. The vial 10 is placed in the removable vial holder 8 to insert and remove it from the device A by limiting contact for the user. The vial holder 8 (shown in FIGS. 6 and 7) is composed of a thick tab 81 having a squared shape which includes a circular through-hole 82 in the central part of the thick tab 81 and said though hole 82 being suitable for receiving a finger from the user so as to handle the vial 10. Vial holder 8 is preferably made of plastic, for example, realized by a 3D printer or in a material allowing the radioactive waves to pass, the principle being to measure the radioactivity of the solution present in the vial 10. The vial holder 8 prevents contamination of the device A in case of sample or waste present on the vial 10 walls. Since the vial holder 8 is removable, it can be cleaned regardless of the device A if it is contaminated.

Typically, the vial 10 can be made of glass in a classic format (example: diameter 2.5 cm, height 5.5 cm) and closed by a rubber cover on the top opening. Other materials can be used for the vial bottle, for example, plastic, and also other sizes requiring an adaptation of the vial holder format.

In the device A (FIGS. 2, 4 and 5), there is a container 12 with two recesses 121, 122, the first recess 121 to receive the vial 10 and the second recess 122 to receive the radioactivity sensor 11. The container 12 is preferably made of rigid polymer, typically by 3D printing, the rigid polymer allowing radiation to pass through. The vial recess 121 has an opening directed to the upper cover 4 of the armored cover 34 so as to receive the vial holder 8 containing the vial 10. The vial recess 121 is preferably in a cylindrical form and the sensor recess 122 is preferably in a square form. The diameters and forms of the recesses depend on the size of the elements 10 and 11 to be received. As a result, recesses can take on all other forms and sizes.

The container 12 is inclined (shown in FIG. 4) to the horizontal axis of the plate 7, the tilt angle alpha being between 10 and 45 degrees but preferably between 10 and 15 degrees. The tilt angle allows a total removal of the vial solution by the syringe even when the solution content is low. The vial 10 can receive a syringe with a rigid or supple needle depending on the delivery mode.

Figure 3:
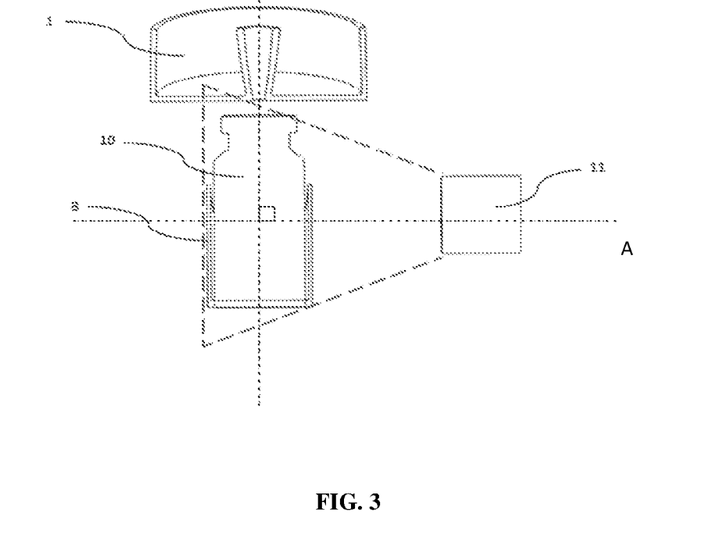
FIG. 3 is an isolated diagram of the detection cone of the radioactive sensor of the device and a vial of FIG. 2.

The distance between the radioactivity sensor 11 and the vial 10 allows the radioactivity sensor 11 to measure the entire vial 10 volume through a detection cone as shown in FIG. 3. The cone detection axis is preferably perpendicular to the vial insertion axis.

The radioactivity sensor 11 comprises silicon PIN photodiodes as semiconductors. Those PIN photodiodes display a detection area between 100 mm$^2$ and 784 mm$^2$. The difference on the detection area is explained by the different vials 10 that the device A is measuring. Sensor 11 must cover the size of the vial 10 but must not be too wide in order to avoid any kind of parasitizing or side effect. The positioning of the PIN photodiode is very important for the measurement of radioactivity as, a simple change in angle or distance regarding the vial 10 can bring significant changes to the measurement. The sensor 11 is thus put at a distance between 2 and 5 mm, depending on the sensor detection area, from the wall of the vial 10 on an axis perpendicular to the measured vial 10. The radioactivity sensor 11 measures the total radioactivity of the vial 10 and displays the result on the digital display screen 9 preferably in real time (shown in FIG. 1), thus enabling the device A to provide direct feedback on the sample quantity withdrawn from the vial 10. The radioactivity sensor 11 can be of any type.

Figure 5:
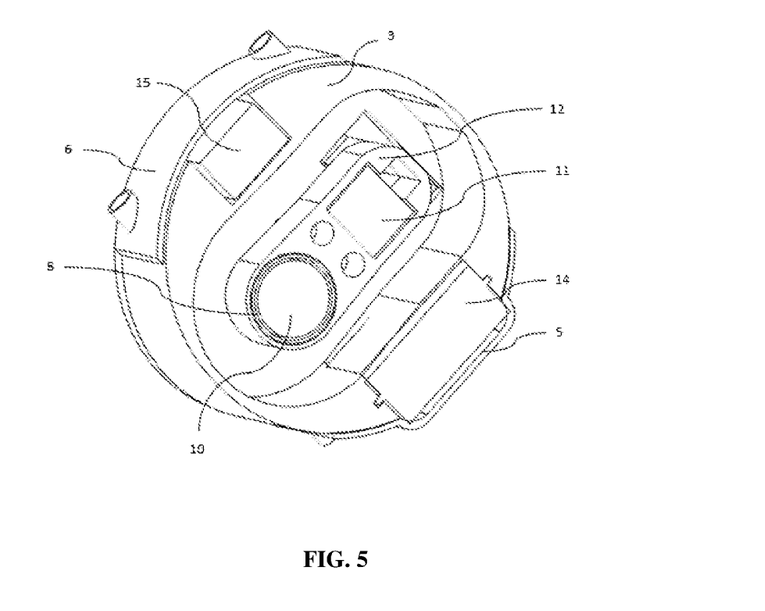
FIG. 5 is a horizontal cross-section view of FIG. 1 showing the container and recesses.

The digital display screen 9 is connected to an electronic board 14 and is placed on the device external periphery in order to leave the display visible to the user. The electronic board 14 is covered by a lower cover 5 as shown in FIGS. 1 and 5. Said lower cover 5 can be made of plastic. The digital display screen 9 can be an LCD screen for example.

The radioactivity sensor 11 is held in place by means for holding said sensor 13 with an external shoulder on its periphery having the same shape as the sensor recess so as to cover the sensor recess clearance. The means for holding said sensor 13 is used to immobilize the radioactivity sensor 11 and therefore avoid detrimental clearance effect during measurement. The radioactivity sensor 11 is immobilized from calibration to use.

The device A is closed using the available closures means 1 or 2. A full end cap 2 is positioned above vial 10 to close the device A and measure radioactivity. An end cap 1 allows a sample or injection of solution into the vial 10 using a syringe though a dedicated opening 111.

"Full" means that the end cap has no opening on its top surface and "opening" for the reference 111 means that the end cap has a pipe conical shaped opening positioned in the center of the end cap. Said conical preferable shape has a decreasing diameter towards the recess 121 for receiving the vial 10. Of course, the opening 111 can be of any convenient shape. The end caps 1 and 2 can be sliding along the oblong opening of the upper cover 4 of the armored cover 34 to insert the vial 10 into the container 12.

The invention is not limited to the examples described and represented.

In order to collect some radioactive sample from a vial 10, the device A is used according a well-established protocol in order to carry out a risk-free measurement of gamma radiation. This protocol includes following steps:
 a. Switching on the device: an operator starts the device A,
 b. Measuring the offset: in some embodiment, the device A automatically carries out a vacuum measurement which eliminates electronically all parasites, but this step might also be manually induced,
 c. Filling a vial 10 with a radioactive solution to be characterized corresponding to authorized and selected products, meaning products previously tested with the device, each product having a different detection curve,
 d. Inserting the vial 10 inside the device A using the removable vial holder 8,
 e. Placing the end cap 1 to close the device A,
 f. Measuring the radioactivity using the sensor 11,
 g. Entering the amount of radioactive solution to be collected using the device's A digital display screen 9,
 h. Inserting, inside the vial 10 a syringe needle,
 i. Collecting the desired amount of radioactive solution using the syringe, the device A measuring real-time radioactivity, thus providing direct feedback on the sample quantity withdrawn from the vial 10.

This allows samples to be taken in a protected and controlled manner with increased precision on the value of the radioactivity sampled, thanks to the screen and real-time counting of the device A.

On the other hand, in order to fill a vial 10 with a radioactive sample, the device A may also be used as follows a. Inserting, inside the device A, an empty vial 10,
 b. Injecting with a syringe needle a required quantity of radioactive solution to be characterized while the device A measures real-time radioactivity, thus providing direct feedback on the sample quantity poured inside the vial 10,
 c. Placing the full end cap 2 so as to close the device A.

The invention claimed is:

1. A device for radioactivity counting and characterization of a solution, said device comprising:
 a container comprising at least two recesses, a first recess for receiving a vial and a second recess for receiving a radioactivity sensor, said radioactivity sensor comprising a semiconductor sensor presenting a detection cone directed to the first recess of the container,
 a removable closure means,
 an armored cover positioned around the container, said armored cover including a radial outer shell and an upper cover as two distinct components, said upper cover comprising an opening for introducing said vial into the container, and
 a protection plate supporting said radial outer shell and allowing total radiation protection,
 wherein the container has a tilt angle between 10 and 45 degrees in relation to the axis perpendicular to the plane of the supporting plate.

2. The device according to claim 1, wherein the removable closure means is an end cap with an opening for introducing a syringe needle.

3. The device according to claim 2, wherein the end cap with an opening for introducing a syringe needle is connected to a pump by means of a tube and a connector of complementary form.

4. The device according to claim 1, wherein the removable closure means is a full end cap for covering a vial.

5. The device according to claim 1, wherein it includes energy supply means.

6. The device according to claim 5, wherein energy supply means are batteries.

7. The device according to claim 1, wherein it includes a keypad.

8. The device according to claim 1, wherein it includes a removable vial holder, said vial holder comprising a tab, said tab comprising a through-hole for receiving a user-finger to allow bringing out said vial holder.

9. The device according to claim 1, wherein it includes an electronic board connected to a digital display screen to display the solution radioactivity, said digital display screen being located on the external surface of said armored cover.

10. The device according to claim 1, wherein the detection cone has an axis perpendicular to the axis of insertion of the first recess of the container for receiving a vial so that the detection is carried out on the full vial volume.

11. The device according to claim 1, wherein the radioactivity sensor has a detection range between 0.5 MBq and 150 GBq.

12. The device according to claim 11, wherein the radioactivity sensor has a detection range between 1 MBq and 120 GBq.

13. The device according to claim 11, wherein the radioactivity sensor has a detection range between 5 MBq and 100 GBq.

14. The device according to claim 1, wherein the container has a tilt angle between 10 and 15 degrees in relation to the axis perpendicular to the plane of the supporting plate.

15. The device according to claim 1, wherein said device includes an isotope measurement means for communicating with the radioactivity sensor to allow said radioactivity sensor to self-calibrate according to the isotope present in the vial.

16. A method for radioactivity counting and characterization of a solution using a device according to claim 1, said method comprising the following steps:
- inserting, inside the device, a vial comprising a solution to be characterised,
- placing an end cap comprising an opening so as to close the device,
- measuring the solution radioactivity using the radioactivity sensor,
- inserting, inside the vial a syringe needle, and
- collecting the targeted solution with required quantity of radioactive solution using the syringe needle while the device measures real-time radioactivity.

17. The method for radioactivity counting and characterization of a solution using a device according to claim 16, said method further comprising the following steps:
- inserting, inside the device, an empty vial,
- injecting with a syringe needle a required quantity of radioactive solution to be characterized while the device measures real-time radioactivity,
- placing a full end cap so as to close the device.

* * * * *